United States Patent
Acar et al.

(10) Patent No.: US 10,075,846 B1
(45) Date of Patent: Sep. 11, 2018

(54) METHOD FOR CONTINUOUS USER AUTHENTICATION WITH WEARABLES

(71) Applicants: Abbas Acar, Miami, FL (US); Hidayet Aksu, Miami, FL (US); Kemal Akkaya, Miami, FL (US); A. Selcuk Uluagac, Miami, FL (US)

(72) Inventors: Abbas Acar, Miami, FL (US); Hidayet Aksu, Miami, FL (US); Kemal Akkaya, Miami, FL (US); A. Selcuk Uluagac, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/674,133

(22) Filed: Aug. 10, 2017

(51) Int. Cl.
| | |
|---|---|
| G06F 7/04 | (2006.01) |
| H04W 12/06 | (2009.01) |
| H04L 29/06 | (2006.01) |
| H04W 12/08 | (2009.01) |
| H04W 88/06 | (2009.01) |

(52) U.S. Cl.
CPC ......... H04W 12/06 (2013.01); H04L 63/0861 (2013.01); H04L 63/102 (2013.01); H04W 12/08 (2013.01); H04W 88/06 (2013.01)

(58) Field of Classification Search
CPC ..... H04W 12/06; H04W 12/08; H04W 88/06; H04L 63/0861; H04L 63/102
See application file for complete search history.

(56) References Cited

U.S. PATENT DOCUMENTS

| | | | | |
|---|---|---|---|---|
| 8,660,322 B2* | 2/2014 | Tsai | ................... | G06K 9/00892 382/118 |
| 2015/0199010 A1* | 7/2015 | Coleman | .............. | A61B 5/0006 345/156 |
| 2017/0011210 A1* | 1/2017 | Cheong | ................ | H04W 12/06 |
| 2017/0080346 A1* | 3/2017 | Abbas | .................. | A63F 13/825 |
| 2017/0372049 A1* | 12/2017 | Tieu | ........................ | G06F 21/36 |
| 2018/0067565 A1* | 3/2018 | Yuen | ...................... | G06F 3/017 |
| 2018/0089916 A1* | 3/2018 | Drako | .................. | H04W 4/021 |
| 2018/0103030 A1* | 4/2018 | Einberg | ................ | H04L 63/083 |

OTHER PUBLICATIONS

Koichiro Niinuma et al., "Soft Biometric Traits for Continuous User Authentication," IEEE, Dec. 2000, pp. 771-780.*
Ingo Deutschmann et al., "Continuous Authentication Using Behavioral Biometrics," IEEE, IP Pro Jul./Aug. 2013, pp. 12-15.*

(Continued)

*Primary Examiner* — Luu Pham
*Assistant Examiner* — Canh Le
(74) *Attorney, Agent, or Firm* — Saliwanchik, Lloyd & Eisenschenk

(57) ABSTRACT

Systems and methods for continuous and transparent verification, authentication, and identification of individuals are provided. A method can include detecting a signal from a sensor embedded in a wearable device, determining a set of features unique to the wearer of the wearable device, creating a user profile of that individual, detecting a signal from a sensor of an unknown individual, determining a set of features unique to the unknown individual, and comparing the features of the unknown individual to the previously created user profile.

14 Claims, 7 Drawing Sheets

(56) References Cited

OTHER PUBLICATIONS

Obaidat, "A verification methodology for computer systems users," Proceedings of the 1995 ACM Symposium on Applied Computing, Feb. 1995, pp. 258-262.

Grabham et al., "Use of a novel keypad biometric for enhanced user identity verification," IEEE International Instrumentation and Measurement Technology Conference, May 2008, pp. 1-5.

Clarke et al., "Authenticating mobile phone users using keystroke analysis," International Journal of Information Security, Aug. 2006, pp. 1-14, vol. 6.

Trojahn et al., "Toward mobile authentication with keystroke dynamics on mobile phones and tablets," Proceedings of the 27th International Conference on Advanced Information Networking and Applications Workshops, Mar. 2013, pp. 697-702.

Owusu et al., "Accessory: password inference using accelerometers on smartphones," HotMobile '12: Proceedings of the Twelfth Workshop on Mobile Computing Systems and Applications, Feb. 2012, pp. 1-6.

"Consumer security risks survey 2016," Kaspersky Lab, Nov. 2016, pp. 1-22.

Keromytis, "Active authentication (Archived)," Defense Advanced Research Projects Agency, 2013, pp. 1-3, https://www.darpa.mil/program/active-authentication.

"Google eyes behavioural solution for continuous authentication," Planet Biometrics News, May 2016, p. 1.

Lamkin, "Wearable tech market to be worth $34 billion by 2020," Forbes, Feb. 2016, pp. 1-3.

Smartwatchr, "2015 smartwatch specs comparison chart," Smartwatch News, May 2015, pp. 1-13.

Sterling, "Study: 60 percent of adults switch screens during the day," Marketing Land, Mar. 2014, p. 2.

Meng et al., "I can be you: questioning the use of keystroke dynamics as biometrics," 20th Annual Network and Distributed System Security Symposium NDSS, Feb. 2013, pp. 1-17.

Serwadda et al., "Examining a large keystroke biometrics dataset for statistical-attack openings," ACM Transactions on Information and System Security, Article 8,Sep. 2013, pp. 1-30, vol. 16, No. 2.

Shinde et al., "Survey of keystroke dynamics as a biometric for static authentication," International Journal of Computer Science and Information Security, Apr. 2016, pp. 203-207, vol. 14, No. 4.

Alsultan et al., "Keystroke dynamics authentication: a survey of free-text methods," International Journal of Computer Science Issues, Jul. 2013, pp. 1-10, vol. 10, Issue 4, No. 1.

Banerjee et al., "Biometric authentication and identification using keystroke dynamics: a survey," Journal of Pattern Recognition Research, Jul. 2012, pp. 116-139, vol. 7.

Teh et al., "A survey of keystroke dynamics biometrics," The Scientific World Journal, Aug. 2013, pp. 1-24.

Noonaka et al., "Sensing pressure for authentication system using keystroke dynamics," Proceedings of World Academy of Science, Engineering and Technology, Jan. 2005, pp. 19-22, vol. 1.

Bailey et al., "User identification and authentication using multi-modal behavioral biometrics," Computers and Security, Preprint, Feb. 2014, pp. 1-13.

Mantyjarvi et al., "Keystroke recognition for virtual keyboard," Proceedings of the IEEE International Conference on Multimedia and Expo, Aug. 2002, pp. 429-432.

Campisi et al., "User authentication using keystroke dynamics for cellular phones," IET Signal Processing, Jun. 2009, pp. 333-341, vol. 3, No. 4.

Maiorana et al., "Keystroke dynamics authentication for mobile phones," Proceedings of the 2011 ACM Symposium on Applied Computing, Mar. 2011, pp. 21-26.

Zheng et al., "You are how you touch: user verification on smartphones via tapping behaviors," IEEE 22nd International Conference on Network Protocols, Oct. 2014, pp. 1-12.

Miluzzo et al., "TapPrints: your finger taps have fingerprints," Proceedings of the 10th International Conference on Mobile Systems, Applications, and Services, Jun. 2012, pp. 323-336.

Wang et al., "Mole: motion leaks through smartwatch sensors," Proceedings of the 21st Annual International Conference on Mobile Computing and Networking, Sep. 2015, pp. 155-166.

Mare et al., "Zebra: zero-effort bilateral recurring authentication," IEEE Symposium on Security and Privacy, May 2014, pp. 705-720.

Ali et al., "Keystroke biometric systems for user authentication," Journal of Signal Processing Systems, Mar. 2016, pp. 1-16.

Huhta et al., "Pitfalls in designing zero-effort deauthentication: opportunistic human observation attacks," The Network and Distributed System Security Symposium, Feb. 2016, pp. 1-14.

Stanciu et al., "On the effectiveness of sensor-enhanced keystroke dynamics against statistical attacks," Proceedings of the Sixth ACM Conference on Data and Application Security and Privacy, Mar. 2016, pp. 1-8.

Wei, Time Series Analysis: Univariate and Multivariate Methods, 2006, Second Edition, Addison-Wesley.

Rattani et al., "Biometric system design under zero and non-zero effort attacks," 2013 International Conference on Biometrics, Jun. 2013, pp. 1-8.

Giuffrida et al., "Memoirs of a browser: a cross-browser detection model for privacy-breaching extensions," Proceedings of the Seventh ACM Symposium on Information, Computer and Communications Security, May 2012, pp. 1-11.

Giuffrida et al., "I sensed it was you: authenticating mobile users with sensor-enhanced keystroke dynamics," International Conference on Detection of Intrusions and Malware, and Vulnerability Assessment, Sep. 2014, pp. 1-20.

\* cited by examiner

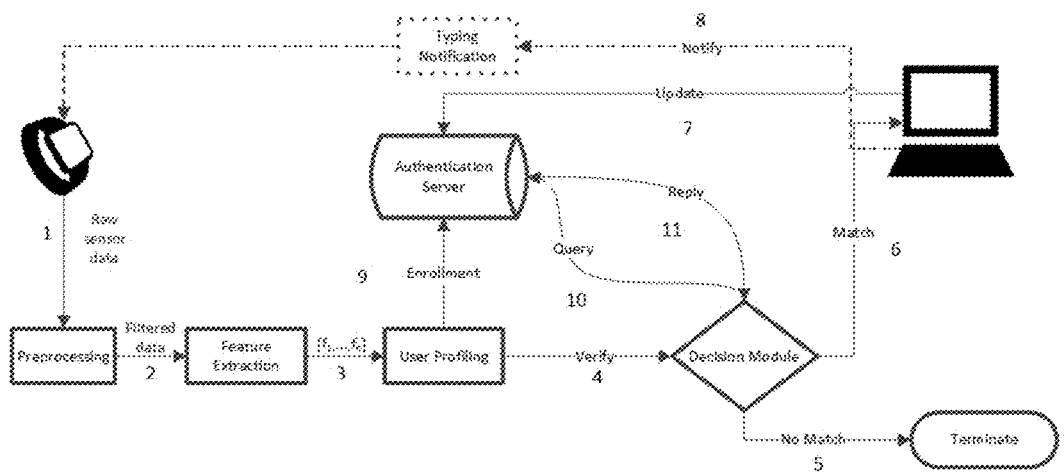
FIG. 1
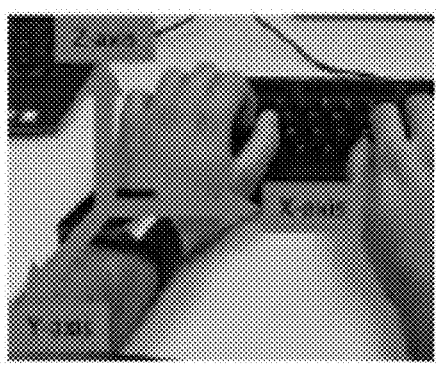 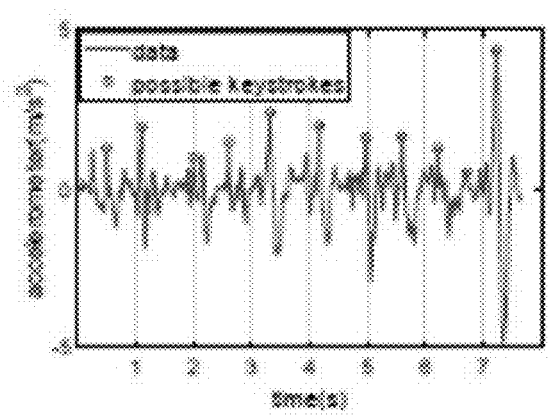
FIG. 2(a)   FIG. 2(b)

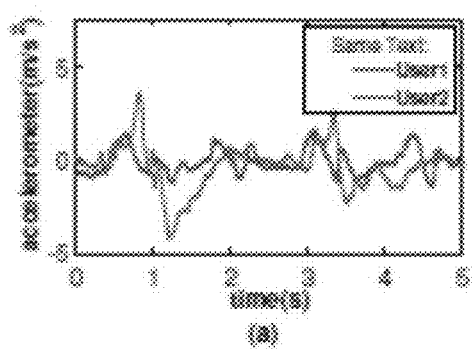 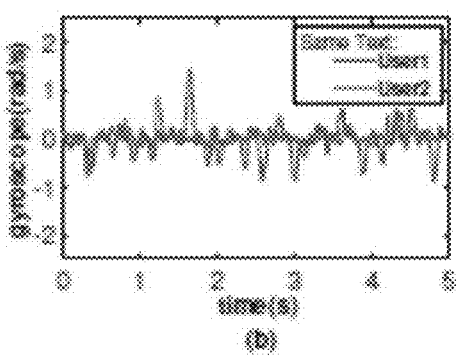
FIG. 3(a)　　　　　　　　　　　FIG. 3(b)
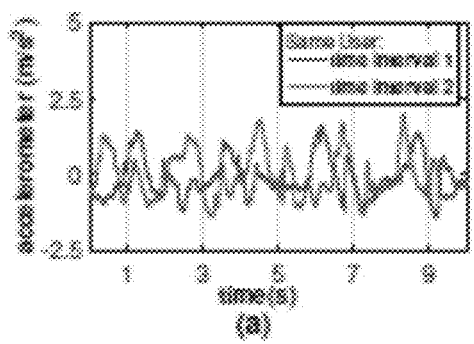 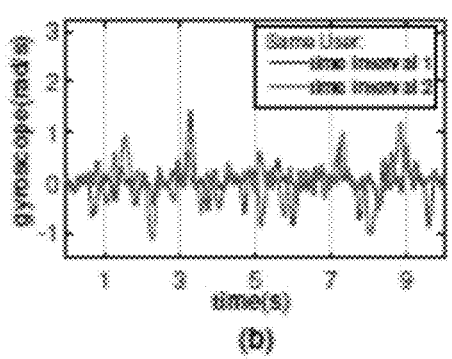
FIG. 4(a)　　　　　　　　　　　FIG. 4(b)

METHOD FOR CONTINUOUS USER AUTHENTICATION WITH WEARABLES

BACKGROUND

Currently, the most common user authentication methods rely on password authentication. However, passwords are easily transferable to other users and most users choose simple, short, and memorable passwords or replicate them across different accounts. This makes passwords vulnerable to dictionary attacks, brute-force, social engineering, and spyware attacks. Traditional authentication methods suffer from one-entry point (i.e., check-point) property.

Wearables such as smart watches and fitness trackers that can be carried by individuals have grown exponentially in a short period of time. It is estimated that one in four smartphone owners will also be using a wearable device such as smartwatch.

BRIEF SUMMARY

Embodiments of the subject invention provide devices methods, and systems for authentication and identification which re-verifies the user periodically without breaking the continuity of a session. Wearables such as smartwatches, glasses, fitness trackers, and medical devices keep track of day-to-day activities, motion, human biometric data such as heart rate, blood pressure. The sensing function of these devices can be used to create an initial identifying data set that can be used to continuously and transparently re-verify a user's identity throughout an entire session.

Embodiments of the subject invention verify a user's identity during an entire session by deploying a continuous complementary authentication. Primary authentication is performed at the beginning of the session. It can include a password (e.g., PIN), token (e.g., ID card), or a biometric (e.g., fingerprint) authentication method. Secondary authentication method is used to re-verify the user's identity transparently. The secondary method can be based on either physiological biometric features such as fingerprint, face, iris or behavioral biometrics such as keystroke dynamics, gesture, and gait patterns. In certain embodiments of the subject invention, the secondary method can be sensor-based keystroke dynamics. WACA supports both password, token, and biometric authentication for the primary authentication.

Experimental results show that embodiments of WACA can achieve 1% EER for 25 seconds or 2-3% EER for 20 seconds of data collection time and False Accept Rate and False Reject Rates are as low as 1-2% and almost a perfect (99%) identification rate.

BRIEF DESCRIPTION OF DRAWINGS

FIG. 1 shows a diagram of the WACA architecture according to an embodiment of the subject invention.

FIG. 2(a) shows an image with a 3D reference coordinate system.

FIG. 2(b) shows a plot of the output response from sensors in a smartwatch.

FIG. 3(a) presents a plot of sensor data of the two users' accelerometer data for a given time interval.

FIG. 3(b) presents a plot of sensor data of the two users' gyroscope data for a given time interval.

FIG. 4(a) presents a plot of sensor data of the same user's accelerometer data for a separate time intervals.

FIG. 4(b) presents a plot of sensor data of the same user's gyroscope data for a separate time intervals.

DETAILED DESCRIPTION

Figure 5A:
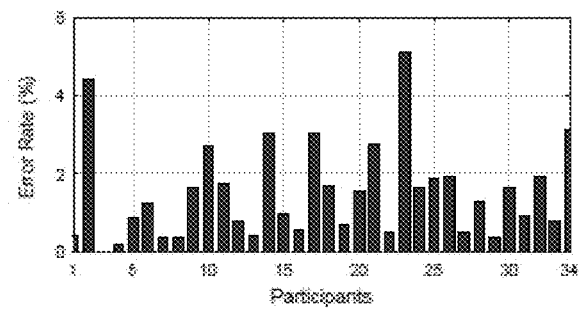
FIG. 5A presents a plot of the speed and error rates of the participants while typing.

The ubiquity of wearable devices makes them a perfect candidate to utilize in continuous authentication settings. The continuous authentication allows users to be re-verified periodically throughout the login session without breaking the continuity of the session. The Wearable-Assisted Continuous Authentication (WACA) framework utilizes the sensory data from built-in motion sensors available on wearable devices to provide a practical and usable wearable-assisted continuous authentication system that can be transparently used on multiple devices.

WACA provides flexibility and scalability in terms of devices and methods that can be used with other devices by using different features instead of keystrokes such as contextual factors (e.g., geolocation, biorhythmic signals, heart rate, etc.). Even multiple devices (e.g., smartwatch & smartphone) can be utilized to authenticate the other device (e.g., computer) using a combination of the proper features. With this property, the security level is increased by adding each device's security. For example, even if the computer is compromised, the system is still secure as an adversary cannot mimic the user's typing behavior.

Keystrokes can be transparently integrated to an existing one-factor or multi-factor authentication system. Fixed-text systems restrict the user's comfort by asking them to type the same text. However, WACA is text-free and extracts the feature from every kind of text after initial login with first factor through a paired and synchronized wearable device.

Most conventional keystroke-based authentication schemes have used Dwell-time and Flight-time as unique features of the users. These features are directly obtained by logging the timing between successive keystrokes. However, in the WACA framework, the feature set is richer, flexible, and scalable for different cases. The WACA feature set can include, for example, 15 different sensory features from both time and frequency domains. These features can be applied to, for example, 6-axes motion sensor data and up to 132 features can be obtained in total.

Embodiments of the subject invention provide keystroke-based continuous authentication frameworks that use data (e.g., keystroke recognition, geolocation, biorhythmic, heart rate, temperature, hand motion, voice, body motion, and/or other user-specific biometric data) from one or more sensors positioned on or near a user. For example, one or more sensors (e.g., motion sensors) can be sensors of a wearable device (e.g., a smartwatch). Any number of sensors can be present (e.g., 1, 2, 3, 4, 5, 6, 7, 8, 9, 10, or more), and each sensor can collect a different type of data than that collected by all other sensors, or some or all sensors can collect the same type of data as one or more (or all) other sensor(s). In some embodiments, a sensor can collect multiple types of data (e.g., one or more (or all) sensors from among a plurality of sensors can collect multiple types of data, and some overlap can be present). WACA comprises four main stages: (1) Preprocessing, (2) Feature Extraction, (3) User Profiling, and (4) Decision Module.

FIG. 1 shows an overall WACA architecture according to an embodiment of the subject invention. The solid directional lines refer to an overt channel, and the dashed directional lines refer to a covert channel. Raw sensor data can be acquired from a wearable device, such as a smartwatch (1) through hardware and software installed on the wearable device. The raw data can be cleaned by applying a low-pass filter (2) and transformed into a proper format for the following stages. Incoming data can be used to extract a set of identification features of the user and inserted into a vector (3), hereinafter referred as a feature vector. The feature vector represents characteristics of the current user profile. In the enrollment phase (9), the created user profile can be securely stored in an authentication server in a secure data center. During the verification phase (4), the questioned user profile is dispatched from the authentication server to a decision module (10) (11) where a similarity score between the returned profile and the provided profile is computed to make a binary decision. If decision is no match (5), then the user access to terminal will be suspended and the user is required to re-authenticate using the primary authentication method. However, when decision is match (6) then the user access is maintained and current profile is added to the authentication server (7). In this way, the user profile is kept up-to-date over time. Whenever a typing activity is initiated on the keyboard of the computer, the wearable device is notified (8) again by the terminal to start over the authentication process continuously.

In the WACA framework, data collection refers to gathering sensor readings from the user's wearable device through a secure wireless communication channel. The software for this purpose, including a mobile application, can be installed on the wearable device to detect signals from physical sensors embedded in the wearable device. Then, the raw sensor data can be transmitted to a computer through a secure communication channel. The collected raw data of an accelerometer is represented in the format of a $\vec{c}c=<t_a, x_a, y_a, z_a>$ and gyroscope is represented as $\vec{gyro}=<t_g, x_g, y_g, z_g>$, where t stands for timestamps and x; y; z represents the different axis value of accelerometer and gyroscope sensors. Each t; x; y, and z is stored as a different vector. All of these vectors are expected to be the same length. The length of the vectors correlates to the sampling rate of the sensors and the time interval that the data is collected.

In WACA, the preprocessing stage refers to preparation of raw sensor readings for the next stages. It includes cleaning and transformation of the raw data. In the cleaning part, first, outliers are detected and removed. Then, a digital filter can be applied to remove the effect of noise, bias, and any unnoticed outliers from data. There are many digital filtering methods that can be used for the smoothing purpose, such as Moving-Average Filter, Additive Smoothing, Kalman Filters, and Savitzky-Golay filters. In order to remove the effect of noise, bias, and any unnoticed outliers from data, an M-point Moving Average Filter (MAF) can be applied, which is a low-pass filter that operates by taking the average of M neighbor points and generates a single output. M-point filtering in equation form can be expressed as follows:

$$y[i] = \frac{1}{M} \sum_{j=0}^{M-1} x[i+j], \quad (1)$$

where x is the raw sensor data, y is the new filtered data, and indicates the current sample that is averaged. The filtered data becomes smoother than the raw data without altering the value at that point. An optimum cut-off value for the filter can prevent information in the data from getting lost. After the noise filtering, the data can be transformed into the appropriate format for the next stage. Particularly, different types of sensors' data can be separated according to an assigned ID number during the sensors' registration, which is assigned by the software and then x, y, and z axes of the sensors' values are recorded as different vectors (e.g., $\vec{x}_a=<x_a^1, \ldots, x_a^n>$ and $\vec{x}_g=<x_g^1, \ldots, x_g^n>$ for a profile consisting of n samples.

Current commercial wearable built-in sensors have very high granularity and can provide up to 9 digits after the decimal point with a predefined constant sampling rate. Therefore, in order to find equivalent time series data for a user, the Feature Extraction (FE) stage is applied to measure the similarity or dissimilarity between the data sets. The feature set used in WACA frameworks is presented in Table 1 according to an embodiment of the subject invention. Hence, the Feature Extraction (FE) stage is applied in order to measure the similarity or dissimilarity between the data sets. In other words, FE refers to the transformation of the input data into a number of features. Then, extracted features are used to create the feature vector of the user. The feature vector is the ID of the user, which is checked in the decision module stage. In the WACA framework, feature extraction stage refers to creating the feature vector.

In certain embodiments, in order to create the feature vector, each feature is computed using the data vectors. As an example, the first feature can be calculated from the function f i.e., $f_1=f(x_a, y_a, z_a, x_g, y_g, z_g)$ and second feature can be calculated from the function g, i.e., $f_2=g(x_a, y_a, z_a, x_g, y_g, z_g)$, etc. Then, a final feature vector $\vec{f}=<f_1, f_2, \ldots, fn>$ can be generated using calculated features. After generating the final feature vector $\vec{f}$, in user profiling, a user profile $\vec{p}$ is generated by combining it with the entered user ID and start and end timestamps of the data sample, i.e., $\vec{p}=<userID, t_{start}, t_{end}, \vec{f}>$. If the user is in the enrollment phase, this profile can be transmitted to the authentication server to be securely stored. Further, if the user is unknown and a typing activity initiation is notified by the computer, the profile is navigated to the decision module.

The feature set used in the WCA framework is presented in Table 1 according to an embodiment of the subject invention.

The feature set includes simple statistical metrics such as mean, median, variance of each 3-axis of the sensors readings and also includes similarity metrics like covariance and correlation coefficients between the axes. Statistical metrics can be early indicators of the tendency or intensity of the set, similarity metrics help to differentiate between the users making motion in multiple or only one coordinate while typing. Moreover, average absolute of peaks can be used to calculate average timing information between successive keystrokes.

Covariance of two real valued variables X and Y is calculated as follows:

$$\text{covariance}(X,Y) = E([X-E(X)][Y-E(Y)]), \quad (2)$$

where X and Y corresponds to the different axis of the accelerometer and gyroscope in the WACA framework and E( ) is the expected value of the variable. Similarly, the correlation can be calculated from the covariance as follows:

$$\text{correlation}(X, Y) = \frac{\text{cov}(X, Y)}{\sqrt{\text{var}(X)\text{var}(Y)}}, \quad (3)$$

TABLE 1

Feature set extracted from sensor data

| Domain | Feature | Length |
| --- | --- | --- |
| Time | Mean, Median, Variance, Average Absolute Difference of Peaks, Range, Mode, Covariance, Mean Absolute Deviation (MAD), Interquartile Range (IQR), correlation between axes (xy, yz, xz), Skewness, Kurtosis, Min, Max, Integration, RMS, Zero-Crossings | 17 * 6 = 102 |
| Frequency | Entropy, Spectral energy, DC component, Coefficient sum, Dominant Frequency | 5 * 6 = 30 |
| Total # of Features | | 132 |

Particularly, correlation and covariance of the pairs ($x_a$, $y_a$), ($x_a$, $z_a$), and ($y_a$, $z_a$) are calculated for accelerometer, then, the same process can be repeated for gyroscope to obtain the features of the gyroscope data. In addition to these time domain features, the set can also include frequency domain features like entropy and spectral energy. The frequency domain features are based on the different typing frequency (period) behaviors of users. This different frequency impacts the energy calculation corresponding to spectral energy and randomness of the feature set corresponding to the entropy. Spectral energy of a signal can be calculated from Fast-Fourier Transform (FFT) of the signal. FFT generates the frequency content of time domain stationary signals over an interval. FFT of a signal is represented using complex numbers, which includes both amplitude and phase information. To calculate the spectral energy:

$$\text{energy}(X) = \frac{\Sigma |FFT(X)|^2}{n}, \quad (4)$$

where n is the number of FFT points and || refers the magnitude of the given complex value. In the WACA framework, spectral energy is used to differentiate the users with different dominant frequency in both acceleration and torque while typing. Different dominant frequency generates different spectral energy. On the other hand, entropy is the measure of uncertainty and higher entropy can mean more flatness in a histogram of the frequency distribution. The entropy of a random variable X of values $x_1, x_2, \ldots, x_n$ with the probabilities $p_1, p_2, \ldots, p_n$ is calculated as follows:

$$\text{entropy}(X) = -\sum_{j=1}^{n} p_j \log_2(p_j), \quad (5)$$

where the entropy discriminates between the users with random motion and the users following similar pattern during entire time interval during typing activity in the WACA framework.

In some embodiments of the subject invention, the next stage in the WACA framework can be the decision module. The task of this stage is to classify the user as authorized or unauthorized for given set of credentials. Two different tasks can be utilized: (1) authentication; and (2) identification. The authentication process refers to whether the provided information or the credentials of given identity is valid while identification is finding the identity of provided credentials from several pre-registered identities. In other words, while the result of authentication is a binary yes or no, the identification returns the user's identity and its validity decision. Identification can be used to find the identity of a user from a predefined list (i.e., finding the insider thread) or as an alternative identification method. It is important to show whether the keystroke data obtained from wearable sensors is unique or not. For this purpose, two approaches can be utilized in the WACA architecture: (1) distance metrics; and (2) machine learning algorithms.

Although both distance measure and machine learning methods can be used interchangeably for both authentication and identification, distance measure methods are mostly preferred in authentication, while machine learning (ML) algorithms are more proper for identification due to computation complexity considerations. Authentication only requires comparing the stored sample with unknown sample so it can compute the result quickly. However, for identification an entire database can be checked and then most proper result can be returned. Distance measure methods can perform authentication by calculating the distance between two vectors or data points in a coordinate plane. This method is directly related to the similarity of compared time-series data sets. The authentication process can use Euclidean distance, which is the distance between two points in vector space and it is the particular case of Minkowski distance, which is expressed as follows:

$$\text{distance}(\vec{x}, \vec{y}) = \left(\sum_{i=1}^{n} (x_i - y_i)^p\right)^{\frac{1}{2}} \quad (6)$$

where $\vec{x} = (x_1, x_2, \ldots, x_n)$ and $\vec{y} = (y_1, y_2, \ldots, y_n)$ are the set of observations to be compared. In the WACA framework, either $\vec{x}$ or $\vec{y}$ corresponds to the data stored in authentication server and the other one is the unknown sample from the user. In certain embodiments, WACA can calculate the distance and return the result by comparing it with a configurable predetermined threshold value (i.e., genuine if distance<threshold, impostor if distance_threshold). As each element of the feature vector has different ranges, some of the features can be dominant in distance measurement. To prevent this and create a scale-invariant feature vector, WACA can first apply a normalization to the feature vector to map the interval $[x_{min}, x_{max}]$ into the unit scale $[0,1]$. This linear normalization process can be formulated as follows:

$$x_{new} = \frac{x - x_{min}}{x_{max} - x_{min}} \quad (7)$$

There are several distance measurement methods the can utilized in biometric authentication systems, which can perform differently in different contexts. In addition to Euclidean, other distance metrics that can be used include cosine distance, correlation distance, Manhattan (cityblock) distance, and Minkowski with p=5.

In certain embodiments of the subject invention, identification is a multi-way decision process, (i.e., a process of finding a class given an unknown sample according to the prior identified samples). Machine Learning (ML) algorithms, especially Neural Network Algorithms can be utilized for identification. Indeed, ML algorithms are class predictors based on the previously provided sample set. The sample set in the WACA framework is the set of feature vectors of users relating to a specific time interval.

ML algorithms can include both supervised learning and unsupervised learning methods. While supervised learning refers to a labeled training set, in unsupervised learning the algorithms is fed with unknown samples and it classifies the unknown sample set according to their similarity. In WACA, according to certain embodiments, a new user can be enrolled for the first time login initially with a username and typing sample obtained from motion sensors, hence, the WACA system utilizes the supervised learning.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A process for continuous verification, the process comprising:
 acquiring data from at least one sensor receiving a signal from a known individual;
 cleaning the sensor data by removing noise signals;
 extracting a set of identifying features from the clean sensor data;
 inserting the identifying features into a feature vector; and
 generating a user profile, Embodiment 2

The process according to embodiment 1, further comprising:
 transmitting the user profile to an authentication server;
 acquiring data from at least one sensor connected to an unknown individual;
 cleaning the sensor data (from the unknown individual) by removing noise signals;
 extracting a set of identifying features from the data from the unknown individual;
 comparing the user profile to the set of identifying features from the data from unknown sensor; and
 determining whether the unknown individual is the known individual.

Embodiment 3

The process according to any of embodiments 1-2, in which the at least one sensor from the known individual is embedded into a wearable device connected to the known individual.

Embodiment 4

The process according to any of embodiments 1-3, in which each sensor of the at least one sensor from the known individual and the unknown individual are assigned an identification number and the acquired data from each sensor is separated according to the identification number.

Embodiment 5

The process according to any of embodiments 1-4, in which the identifying features can be generated from the time domain and/or the frequency domain.

Embodiment 6

The process according to any of embodiments 1-5, in which the data from the sensor receiving the known individual comprises at least one of keystroke recognition, geolocation, biorhythmic, heart rate, temperature, hand motion, voice, body motion, and other user-specific biometric signals.

Embodiment 7

The process according to any of embodiments 1-6, in which the user profile includes a feature vector, in which the feature vector is a set of features.

Embodiment 8

The process according to embodiment 7, in which each feature is calculated from data acquired from the at least one sensor received a signal from the known individual.

Embodiment 9

The process according to any of embodiments 1-8, in which the user profile further includes a user identification, a time stamp for the beginning of data collection, and a timestamp for the end data collection.

Embodiment 10

The process according to any of embodiments 1-9, in which determining whether the unknown individual is the known individual further comprises determining the validity of the data acquired from the unknown individual and locating the user profile of the known individual.

Embodiment 11

The process according to any of embodiments 1-10, in which the process further comprises restricting access to a computer system operated upon by the known individual if the unknown individual is determined to not be the known individual.

Embodiment 12

The process according to any of embodiments 1-11, in which each time a signal is acquired from the unknown individual, after determination of whether the unknown individual is the known individual is complete, the process re-determines whether the unknown individual is the known individual.

Embodiment 13

A system of continuous verification, the system comprising:
at least one sensor configured to acquire a signal from a known individual; and
a processor in operable communication with the at least one sensor,
in which the processor is configured to:
acquire data from at least one sensor receiving a signal from the known individual;
clean the sensor data by removing noise signals;
extract a set of identifying features from the clean sensor data;
insert the identifying features into a feature vector;
generate a user profile and transmit the user profile;
acquire data from at least one sensor connected to an unknown individual;
extract a set of identifying features from the data from the unknown individual;
retrieve the user profile;
compare the user profile to the set of identifying features from the data from unknown individual; and
determine whether the unknown individual is the known individual.

Embodiment 14

The system of embodiment 13, further comprising an authentication server in communication with the processor, in which the authentication server is configured to receive the user profile from the processor, and transmit the user profile to processor; and
a (non-transitory) machine-readable medium (e.g., a (non-transitory) computer-readable medium, such as one that is part of a computer system) in operable communication with the processor.

Embodiment 15

The system according to any of the embodiments 13-14, in which the at least one sensor from the known individual is embedded into a wearable device connected to the known individual.

Embodiment 16

The system according to any of the embodiments 13-15, in which each sensor of the at least one sensor from the known individual and the unknown individual are assigned an identification number and the acquired data from each sensor is separated according to the identification number.

Embodiment 17

The system according to any of the embodiments 13-16, in which the data from the sensor receiving the known individual comprises at least one of keystroke recognition, geolocation, biorhythmic, heart rate, temperature, hand motion, voice, and body motion, and other user-specific biometric signals.

Embodiment 18

The system according to any of the embodiments 13-17, in which the user profile further includes a user identification, a time stamp for the beginning of data collection, and a timestamp for the end data collection.

Embodiment 19

The system according to any of the embodiments 13-18, in which the at least one sensor is an accelerometer or a gyroscope.

Embodiment 20

The system according to any of the embodiments 13-19, in which the processor is further configured to transmit a signal to a computer system operated upon by the known individual that restricts access to the computer system.

Embodiment 21

The system according to any of the embodiments 13-20, in which the processor is further configured to verify the unknown individual through password verification.

Embodiment 22

The system according to any of the embodiments 13-21, in which the identifying features can be generated from the time domain and/or the frequency domain.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

In order to evaluate how motion sensors of a wearable device (i.e., a smartwatch) are affected when something typed on a keyboard, the following experiment was conducted. A user wore a smartwatch and typed on a qwerty-type built-in keyboard of a computer. To collect smartwatch sensor data, an Android Wear app recorded the raw sensor signals from motion sensors to a file created in the smartwatch's internal storage. To conduct the experiments, linear acceleration composite sensor data, which combines the data of accelerometer and gyroscope (if present) was used to exclude the effect of gravity. Linear acceleration uses continuous reporting mode, which means the app continuously records signals from the sensors at a constant sampling rate. Accelerometer and gyroscope sensors provided three dimensional sensor data. The reference coordinate system associated with the sensors is illustrated in FIG. 2(a), where the rotation is positive in the counter-clockwise direction, i.e., the right handed coordinate system. The z-axis of the accelerometer sensor is directly affected by the key up-down movements of a user while typing and significant changes can be observed in z-axis. Sample data as seen in FIG. 2(b), was acquired from the z-axis of the accelerometer during typing the word "smartwatch". Visual inspection shows that at some points the value of the accelerometer makes some peak points. As the acceleration through the gravity corresponds to the downward movement of the accelerometer, the peak points in the figure correspond to the keystrokes in typing activity. While amplitude of the peak is related to how strong the key press is, the width of the peaks are associated with how long the key is pressed. These are simple characteristics that can be used to identify the users.

Example 2

In order to verify whether different users perform different patterns typing the same text, the following experiment was conducted. In this experiment, data collected from two different users while typing the same text was compared. FIG. 3(a) presents the sensor data of the two users' accelerometer and gyroscope data for a given time interval. Distribution of the accelerometer data shows clear differences such is the magnitude of peaks, inter-arrival time of peak points, width of peaks, etc. On the other hand, gyroscope sensor measures the rotation of the watch. As seen in FIG. 3(b), the number of peaks or the magnitude of the peaks are different for different users; so these features are viable candidates to recognize different users.

Example 3

In order to verify that the same user follows similar patterns over different time intervals even while typing different texts, the following experiment was conducted. Data was collected from the same user over two different time intervals. As can be seen in FIG. 4(a), the amplitudes and widths of the peaks are similar in magnitude, but with a phase shift meaning leading or lagging. On the other hand, same leading or lagging of similar shapes can be seen also in the gyroscope data as well in FIG. 4(b). These two observations help us to support the concept that while keystroke dynamics obtained from smartwatch accelerometer and gyroscope sensors can differentiate different users as classical keystroke dynamics, and same users can be detected over different times referring to different texts.

Example 4

For the following examples, data was collected from 34 human subjects whose ages ranged from 18 to 38 years with a mean of 25.5 and standard deviation of 4.1. Full characteristics of participants are given in Table 2.

During the data collection, an Android Wear smartwatch with an installed data collection app was distributed to each participant, who was then asked to type a provided text in a controlled environment while the program in the smartwatch was recording its sensory data. The choice of the hand that the smartwatch is worn was left to the participant. Moreover, they were also informed to adjust the sitting position and the keyboard and screen position according to their comfort. The participants were involved in three tasks and they are asked to type with their normal typing style without noticing that their data is recorded. The three data sets were created as follows: Set 1 (Free-Text): The participants were asked to type a story from a set of short and simple stories from the American Literature for four minutes. The story was chosen randomly by the participants. In average, four minutes data corresponds to 144 words and 861 characters, and 50000 samples for each participant. These data sets were divided into multiple pieces and analyzed. This free-text experiment was created to test the WACA framework for the systems that use free-text, not fixed text. Set 2 (Same-Text): For this data set, all participants were asked to type the same text for four minutes. A fixed-text authentication system can be utilized in addition to password login systems to increase the security. This data set characterizes participants' typing styles and extracts the features to identify the different users. Note that, the same-text experiment data sets were also used to train the machine learning algorithm, where free-text experiments were used in the testing stage. Set 3 (Imitation Attack): The participants were instructed to imitate someone else's typing pattern by watching a prerecorded video of the person. For these experiments, one of the participants was recorded on video while typing a short and simple sentence for 15 seconds from a perspective that the hand motions, smartwatch, keyboard, and the half of the screen could be seen. It is left to the participant to type the exactly same text or imitate the hand movement of the victim.

Figure 5B:
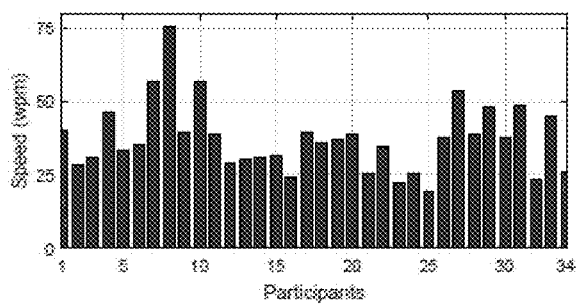
FIG. 5B present a plot of the speed and error rates of the participants while typing.

In order to characterize the participants' typing performances, the sensor data and typed the text was saved and analyzed. The speed and error rates of the participants while typing are presented in FIGS. 5A and 5B. The speed is measured in word per minute (wpm) and error is calculated by comparing the typed text with the original one character wise. As can be seen in FIGS. 5A and 5B, typing speed of participants ranged from 20 to 75 wpm and error rates were under 5% for all participants.

TABLE 2

| Characteristic of participants | | |
|---|---|---|
| Age | Mean | 25.4 |
| | Std | 4.1 |

TABLE 2-continued

| Characteristic of participants | | |
|---|---|---|
| Gender | Male | 22 |
| | Female | 12 |
| Computer Experience | Intermediate | 18 |
| | Expert | 16 |
| Smartwatch Brand | Samsung Gear Live | 20 |
| | LG G Watch R | 14 |
| Watch Hand Preference | Right | 7 |
| | Left | 27 |

In order to get a non-stop continuous stream of data during the data collection, the participants were instructed to ignore errors in 4-5 characters even if they notice them during the experiment. After the experiments, if 4-5 errors are detected in a very close range, that part of the data was removed from the data set. Only a few hundred readings out of 50,000 readings for only two participants were removed.

In order to acquire the smartwatch sensor raw data, an Android Wear app, which first registered the sensors, recorded the sensor signals, and then stored the sensor readings to a file in the internal storage of the smartwatch. Accelerometer and gyroscope data was collected with onSensorChanged mode and sensor data is collected in the sensor_delay_fastest mode for both accelerometer and gyroscope. Standalone QWERTY keyboards were used in order to produce generic results.

In authentication experiments, Equal Error Rate (EER) was calculated using two metrics: False Acceptance Rate (FAR) and False Reject Rate (FRR). FAR is the rate of incorrectly accepted unauthorized users among all the illegal attempts: The increase in FAR is a directly threat to system security level. For more valuable assets, increasing the related threshold will decrease FAR. On the other hand, FRR is the rate of incorrectly rejected authorized users among all legal attempts. Contrary to FAR, FRR can be decreased by decreasing the value of the threshold. FAR and FRR can be calculated as follows:

$$FAR = \frac{\text{False Accepts}}{\text{All impostor attempts}} \quad (8)$$

$$FRR = \frac{\text{False Rejects}}{\text{All legitimate attempts}} \quad (9)$$

Finally, EER is the point that gives closest FAR and FRR point for a given threshold (ideal EER is the intersection point of FAR and FRR). Since it is an error rate, the lower EER refers to a better system. On the other hand, in identification experiments, the main parameter is the accuracy, referring to the rate of correctly classified samples by the algorithm. A weighted False Positive Rate (FPR) was used to test the different machine learning algorithms. First, an FPR value was calculated for each participant using leave-one out cross validation and arithmetic mean of all FPRs gives the weighted FPR:

$$FPR = \frac{FP}{FP + TN} \quad (10)$$

where TN, FP, and TN stand for the number of true negatives, false positives, and false negatives, respectively. Moreover, the area under the Receiver Operating Characteristic (ROC) curve was also used to test how the classifiers are performing regardless of what the class probabilities are. The ROC curve is obtained by plotting True Positive Rate (TPR) in function of False Positive Rate (FPR) for different threshold values.

In the preprocessing stage of the experiment, the sensor readings from outliers were cleaned and then filtering was applied to remove the noise. The filtering prevents from having an edge on the plot and increases the smoothness of the output. The larger M in M-point MAF filter increases the smoothness, but some of the points with high frequency can be lost as well. A 9-point MAF was used and since the data was sampled around 100 Hz, it provided maximal filtering at fundamental frequency of 100 Hz and cut-off frequency of filter was obtained at 9*100=900 Hz. The filtering was applied on all axes of the sensor data.

The data sets were split into equal sized pieces. Each piece was referred to as a sample. Each sample consisted of 8 columns of data, where two were timestamps. Each column has the same length as the sample size. Sample size is one of the main parameters in the experiments as it has a direct impact on the time required to collect data. Particularly, the time t required to collect that sample size can be t=sample size/100 in units of seconds. FAR ratio or FRR can be arranged according to convenience-security trade-off. High FAR is not acceptable for high security systems. Although it could be tolerable for some systems, it may not be acceptable for some high security applications. To decrease FAR, the threshold value should be decreased, which can cause denial of more genuine users, i.e., FRR can increase. Because of these considerations, comparing the different systems, EER, where FAR is equal to FRR, is widely preferred, but the handicap of this metric is that EER is calculated for each user individually and it may vary for each person. In order to show how it varies for each participant in the experiment, we plotted EER for each person in FIGS. 6 and 7. A lower EER can result in better detection of both genuine users and impostors on average.

Figure 6:
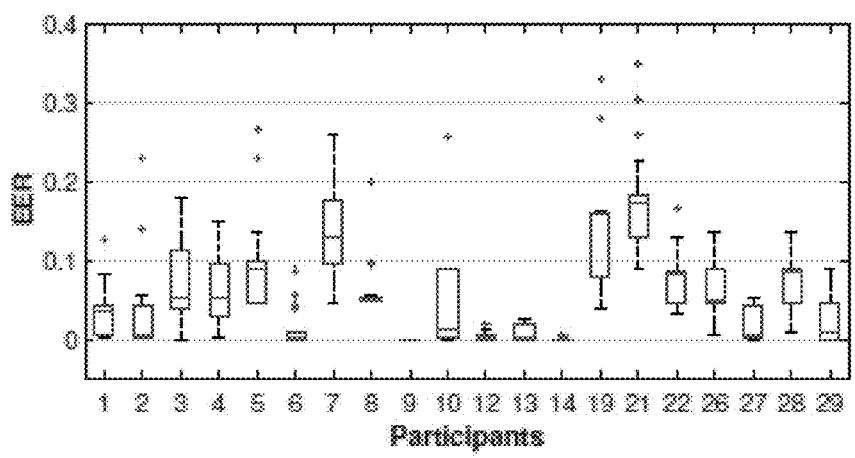
FIG. 6 presents a plot of Equal Error Rate (EER) for participants in sample set 1.
Figure 7:
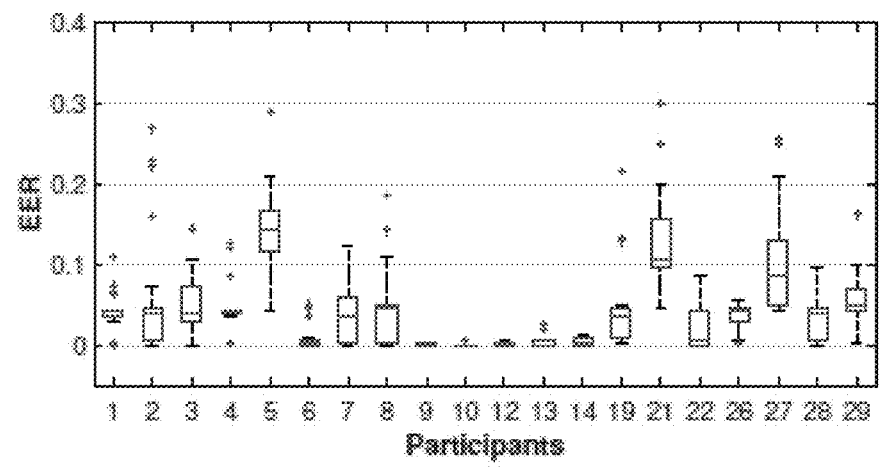
FIG. 7 presents a plot of EER for participants in sample set 2.

For this experiment, both Set 1 and Set 2 data were split into equal sized samples. Then, a dissimilarity matrix was calculated by measuring the distance of each sample to all other samples, (i.e., leave-one-out cross-validation method). The dissimilarity matrix is an N×N matrix, where N is total number of samples for all the participants. In the dissimilarity matrix, the first row represents the distance of first sample of first user to all other samples including its own user and all other users. Then, the first row is separated into intra-samples and inter-samples. Then, for a given threshold, the ratio of rejected samples within the intra samples set was called as FRR and the ratio of accepted samples within the inter samples was called as FAR. This process was repeated by incrementing the threshold by a small amount. Then, an EER was calculated by intersecting the plots of FAR and FRR. Finally, this calculation was repeated for all samples of all users. This gave a set of EER for each participant, which is plotted in FIG. 6 for Set 1 and FIG. 7 for Set 2. A relationship between EER and user typing error rate or user's typing speed was not detected. FIG. 6 and FIG. 7 are both plotted using Manhattan (Cityblock) distance and a sample size of 1000 for illustration purposes. FIG. 7 compares the individual EER while all participants typing same text. As FIG. 6 indicates, participants 9, 12, and 14 have the lowest EER, which mean they are easily differentiable (low EER) from others, but participant 7, 9, and 21 have EERs above 0.1 meaning that 1 denial out of 10 legitimate attempts or 1 acceptance out of 10 impostor attempts. Average EER for same-text experiment in FIG. 6 was calculated as 0.00647. On the other hand, FIG. 7 compares the EER of participants for the free-text experiment using Set 2. Average EER for this experiment is 0.0513. Similar to the first experiment, Manhattan distance is used as a distance metric and sample size 1000 because of the stability after several preliminary trials.

Example 5

Figure 8:
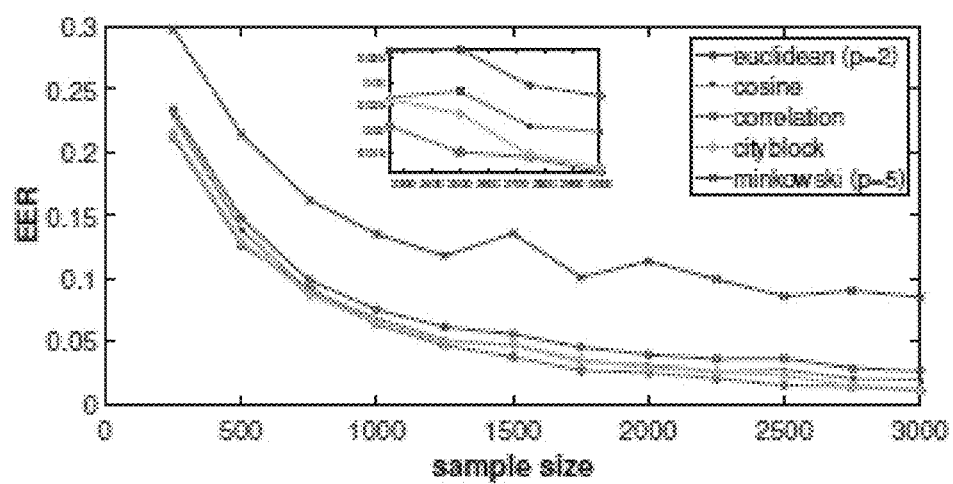
FIG. 8 presents a plot of the relationship between sample size and EER.
Figure 9:
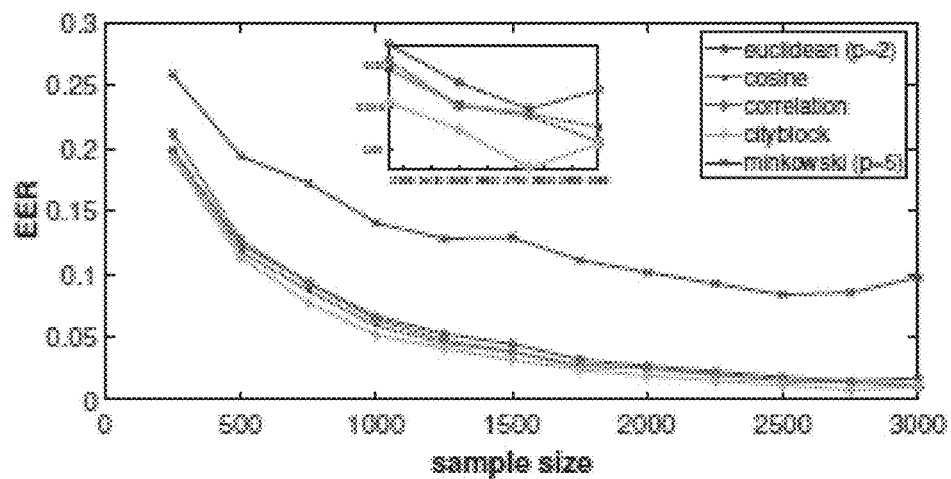
FIG. 9 presents a plot of the relationship between sample size and EER.

In order to decide optimum sample size and distance metric, different sample sizes were tested using different distance measures in the following experiments. The size of a sample is decided by two different variables, the sampling rate and the duration. The sampling rate in the experiments was constant and around 100 Hz or 100 samples per second. Therefore, changing sample size refers directly to changing the duration of the sample in the test and 100 samples correspond to 1 second collection time of data. In order understand the impact of the sample size on WACA, the following experiment was conducted. The goal was to observe lower EER rates in larger sizes and also the convergence of EER to a certain value as the sample size increased since the participant's profile would settle down. Finally, we also used different distance metrics in order to compare the performance of different distance metrics. FIG. 8 and FIG. 9 shows that, in addition to threshold, the sample size is also an important parameter in WACA because adjusting its value directly affects both EER and the accuracy rate. Increasing the sample size, increases the accuracy, but the data collection time also increases. This would suggest the time required catching an adversary or more generally the re-verification period is also increased. However, as can be seen in the FIG. 8, the EERs are decreasing under 0.05 after sample size 1500 and converging to the value of 0.01-0.03 through the sample size 3000. Therefore, increasing the sample size does not change much the EER much after sample size of 3000. While in the same-text experiment maximum EER 0.01 is achieved using both Correlation and Cityblock distance at the sample size 3000, in free-text experiment, the maximum EER 0.005 is achieved with at sample size 2750 with Cityblock distance metric. However, FIG. 9 shows the lines are starting to converge around sample size 1500-2000. Therefore, the optimum value for a real life application could be 2000 samples with EER 2-3%, which requires around 20 seconds for data collection. On the other hand, if one wants a lower EER like 0.01 or lower, he has to use sample size at least 2500, which requires almost 25 seconds.

Example 6

Biometric identification has two forms, positive and negative identification. In positive identification, the unknown user claims an identity explicitly, but negative identification does not require any identity to compare with the database. As other biometrics, the negative identification is more feasible in the WACA framework it considers an adversary who has compromised the first factor, in which the username and password are already entered. In the identification of unknown samples, there are two different parameters, sample size and the size of training set. The sample size is the same as the one used in authentication experiments. However, in the authentication experiments, there was no need to use a training set to feed the algorithms or so called distance measures because if one uses machine learning algorithms for the classification, the algorithm should be trained to build a model using a training set. The size of the training set directly affects the accuracy and it also affects the time required to build the model. In the experiments, the size of the training set corresponds to the number of samples in the training set.

In order to show the effect of sample size and the size of the training set on the accuracy and some other related parameters of the system, two scenarios were created that could be deployed in real applications. In the first scenario, the model used the fixed-text and tested WACA again on fixed text data set. This type of scenario can be realized as login-time checkers in real life applications as an additional security counter-measurement since the user will always use the same password to login for both enrollment and verification. The results are presented in Table 3.

In the second scenario, the model was trained with a fixed text set, which is the same for all participants and tested using the free-text, which is randomly chosen by the participant. This scenario is feasible for the cases that all users are enrolled using the same text but a user is verified while typing a random text. Finally, the results are presented in Table 4.

TABLE 3

Scenario 1. Same text is used for both training and testing "Multilayer Perception"

Sample size

| | Accuracy (%) | | | | | | |
|---|---|---|---|---|---|---|---|
| 1500 | 77.8 | 93.7 | 97.2 | 98.4 | 99.2 | 92.9 | 100 |
| 1000 | 62.8 | 87.6 | 93.8 | 95.3 | 97.1 | 98.4 | 99.2 |
| 500 | 37.5 | 63.7 | 75.9 | 83.1 | 89.6 | 96.4 | 97 |
| 250 | 28.5 | 43 | 53.1 | 61.8 | 62.1 | 92.2 | 93.5 |
| Training Set | 1 | 2 | 3 | 4 | 5 | 33% | 66% |

| | Time taken to build model (seconds) | | | | | | |
|---|---|---|---|---|---|---|---|
| 1500 | 0.99 | 2.02 | 3 | 3.99 | 4.94 | 12.67 | 12.7 |
| 1000 | 1 | 1.99 | 2.98 | 3.95 | 4.94 | 19.3 | 19.39 |
| 500 | 0.98 | 2.02 | 3.01 | 3.98 | 4.95 | 39.61 | 38.72 |
| 250 | 1 | 1.95 | 2.93 | 2.92 | 4.95 | 77.17 | 78.71 |
| Training Set | 1 | 2 | 3 | 4 | 5 | 33% | 66% |

TABLE 3-continued

Scenario 1. Same text is used for both training and testing "Multilayer Perception"

Sample size

| | Weighted FPR | | | | | | |
|---|---|---|---|---|---|---|---|
| 1500 | 0.013 | 0.003 | 0.002 | 0.001 | 0 | 0.004 | 0 |
| 1000 | 0.02 | 0.007 | 0.003 | 0.003 | 0.002 | 0.001 | 0.001 |
| 500 | 0.033 | 0.019 | 0.013 | 0.009 | 0.006 | 0.002 | 0.002 |
| 250 | 0.037 | 0.029 | 0.024 | 0.019 | 0.019 | 0.004 | 0.004 |
| Training Set | 1 | 2 | 3 | 4 | 5 | 33% | 66% |

| | Weighted ROC Area | | | | | | |
|---|---|---|---|---|---|---|---|
| 1500 | 0.983 | 0.999 | 1 | 1 | 1 | 0.997 | 1 |
| 1000 | 0.966 | 0.994 | 0.998 | 0.999 | 1 | 1 | 1 |
| 500 | 0.883 | 0.952 | 0.981 | 0.989 | 0.991 | 0.998 | 0.999 |
| 250 | 0.805 | 0.892 | 0.925 | 0.946 | 0.954 | 0.994 | 0.995 |
| Training Set | 1 | 2 | 3 | 4 | 5 | 33% | 66% |

TABLE 4

Scenario 2: Trained with fixed-text and tested using free-text, "Multilayer Perception"

Sample Size

| | Accuracy (%) | | | | | |
|---|---|---|---|---|---|---|
| 1500 | 55.8 | 80.1 | 88.7 | 89.8 | 91.8 | 93.4 |
| 1000 | 51.7 | 82.7 | 83.2 | 86.1 | 86.8 | 92 |
| 500 | 29.9 | 51.3 | 66.7 | 73.8 | 76.5 | 89.9 |
| 250 | 22.1 | 33.6 | 41.9 | 49.8 | 54.1 | 84.5 |
| Training Set | 1 | 2 | 3 | 4 | 5 | full |

| | Time taken to build model (seconds) | | | | | |
|---|---|---|---|---|---|---|
| 1500 | 1 | 1.97 | 2.97 | 4.01 | 4.99 | 12.46 |
| 1000 | 1 | 1.99 | 2.95 | 4.04 | 4.93 | 19.3 |
| 500 | 0.99 | 2 | 2.98 | 3.98 | 4.98 | 38.94 |
| 250 | 0.99 | 1.96 | 3.02 | 3.96 | 4.96 | 77.46 |
| Training Set | 1 | 2 | 3 | 4 | 5 | full |

| | Weighted FPR | | | | | |
|---|---|---|---|---|---|---|
| 1500 | 0.026 | 0.011 | 0.007 | 0.006 | 0.005 | 0.004 |
| 1000 | 0.028 | 0.01 | 0.009 | 0.008 | 0.08 | 0.005 |
| 500 | 0.04 | 0.028 | 0.019 | 0.015 | 0.013 | 0.006 |
| 250 | 0.042 | 0.036 | 0.03 | 0.027 | 0.024 | 0.009 |
| Training Set | 1 | 2 | 3 | 4 | 5 | full |

| | Weighted ROC Area | | | | | |
|---|---|---|---|---|---|---|
| 1500 | 0.965 | 0.992 | 0.998 | 0.998 | 0.999 | 0.998 |
| 1000 | 0.929 | 0.99 | 0.994 | 0.994 | 0.997 | 0.997 |
| 500 | 0.826 | 0.928 | 0.968 | 0.979 | 0.984 | 0.997 |
| 250 | 0.77 | 0.857 | 0.894 | 0.92 | 0.93 | 0.989 |
| Training Set | 1 | 2 | 3 | 4 | 5 | full |

Figure 10:
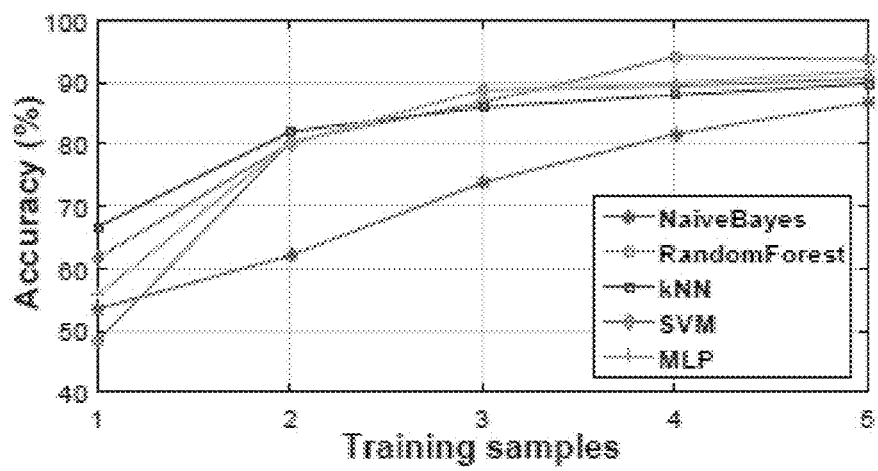
FIG. 10 presents a plot comparing the different machine learning (ML) algorithms for different size to training sets when the sample size is 1500.

As can be seen in Table 3, 100% identification rate can be achieved with the sample size 1500 and training set is 33% of the total set. A very high accuracy (97.1%) can be achieved with sample size=1000 and training set=4, where the time taken to build such a model can be decreased also decreased to half. Scenario 2 was created to answer the question of "Can a user be identified while typing a random text?" The reason why the same text is used to build the model is to omit the effect of the text. This is applicable in real life since all users are provided a predefined text to register the system and then the users' profiles are checked without knowing the text itself. Table 4 presents the result of the experiment for Scenario 2. As can be seen from Table 4, similar to Scenario 1, the accuracy rates increase as the sample size and training set increase. When 3 samples are used in the training and sample size 1500 or 4 samples in the training with the sample size 1000 could be two possible optimum choices for a real case usage. In order to test the performance of some well-known ML algorithms on the data, Scenario 2 was used and results plotted on FIGS. 10 and 11. FIG. 10 compares the different ML algorithms for different size to training sets when the sample size is 1500.

Figure 11:
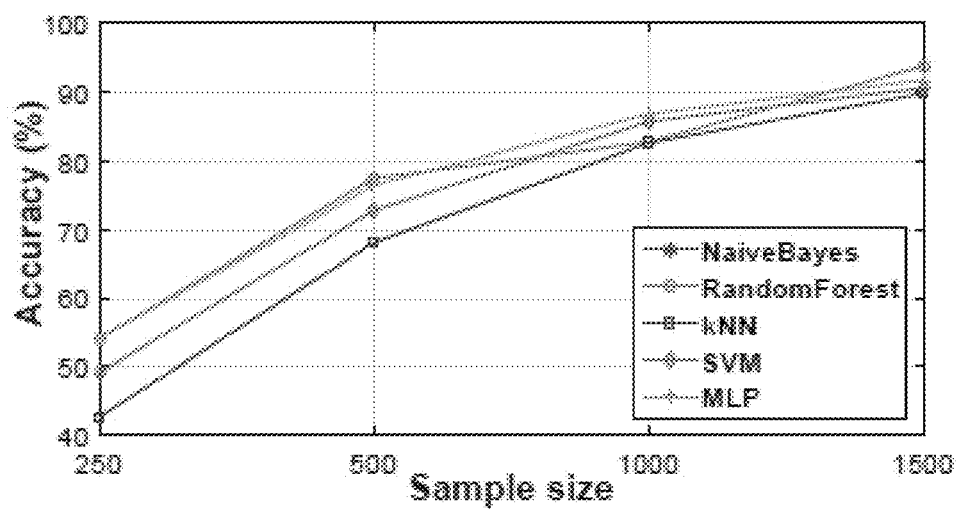
FIG. 11 presents a plot comparing different ML algorithms for different sample sizes while number of training samples is 5.

As seen in FIG. 10, while NaiveBayes remains linearly increasing, the other algorithms start to converge to an accuracy value around 90%-92%. On the other hand, FIG. 11 compares different ML algorithms for different sample sizes while number of training samples is 5. It is clear that in FIG. 11, all algorithms perform similar and are increasing with the sample size.

Example 7

In this experiment, performance of an adversary, who is aware of that the WACA is already installed on the current system, is tested. The Adversary is assumed to be watching his victim by standing nearby. He is assumed that he can perform an opportunistic attack by waiting an appropriate timing to mimic his victim and while waiting he can watch is victim as much as he can. In order replicate the imitation attack defined above, a 15 seconds video was recorded, in which fingers, watch, and the keyboard could be seen on the screen. The video was repeated and start time to attack is leaved to the participant so that the participant could watch video multiple times. This scenario gives participants more chance than an attack in real life for imitation attacks since what a person is typing will change over time in a real life.

The victim's data was also collected the victim's data to evaluate the performance of the attackers. In order to evaluate the performance of the attackers, as in the previous experiments, data was divided into equal sized pieces and intra-distances within the set of samples from the victim and inter-distances between the victim's sample set and attackers' sample set were calculated. Then, for an optimum threshold which gives FRR under 0.1, FAR was calculated. Each sample's distance to each other and to the samples from attackers were different, each sample had a different attack success rate. The results are presented in FIG. 12.

Figure 12:
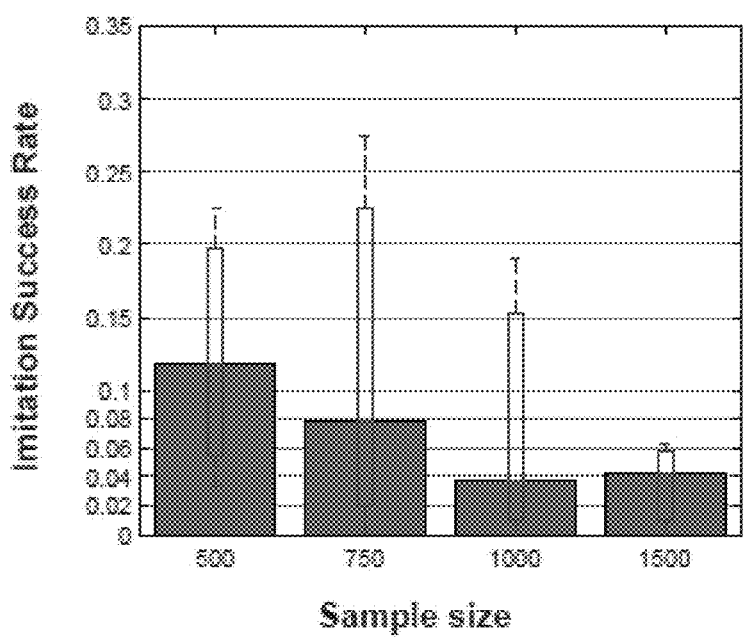
FIG. 12 presents an adversary's success rate in relation to sample size.

As presented in FIG. 12, different sample sizes show different success rates. The highest success rate is achieved when the sample size is equal to 500 and the success rates are decreasing to lower rates as the sample size increase. The same effect is also seen in the authentication and identification experiments. A sample size of 500 roughly corresponds to almost 2-3 keystrokes for the sampling rate that we used, which is not enough to measure and settle down some of features. However, increasing the sample size to 1500, exhibits a low probability (0.0417) that an attacker imitating a legitimate user is not differentiated from the victim. It should be noted that the success rate after the imitation attacks for sample size 1500 is increased by 31.9% (0.0316-0.0417) using Manhattan distance, which gives best result in the authentication experiment. Therefore, even if the attacker is aware of the authentication system based on the sensory-based WACA framework, an imitation attacks increase EER for some cases, the attacker still has very low chance.

Example 8

In order to test WACA against statistical attacks, the following experiment was conducted. The attack algorithm used the complete sample set as input, then one participant was chosen as a victim and the others were used to generate forged data samples. Later, forged samples were used to attack to the victim. In order to create the forged samples, first binning methods were applied to each feature according to the given binNumber.

Then, bins were sorted according to their occurrences for that feature. Then, top best bins were chosen for the given topBins and only topBins were used in the combinations. Finally, the samples were created by generating random numbers between chosen topBins' edges. This process is repeated for each user in the data set, which returns one forged sample. Then, different combinations are used to create outNumber many forged samples. Finally, the average EER of all users was calculated against the created forged samples. At first, the outNumber was given as an input to the algorithm, but then it was determined that even if one of forged samples were successful, the copies of that forged samples would increase EER. Therefore, the same amount of forged samples was generated as the victim' sample number. Finally, average EER of the victim was computed for each sample against to all forged samples. At this point, EER can be interpreted as the ratio successfully accepted forged samples for the current victim. Before running the algorithm for attacking on WACA, EER for each user was calculated without adding any forged data to see the effectiveness of the attack, hereinafter referred as the old EER. Then, algorithm 1, as seen in FIG. 13, was run.

Figures 13, 14:
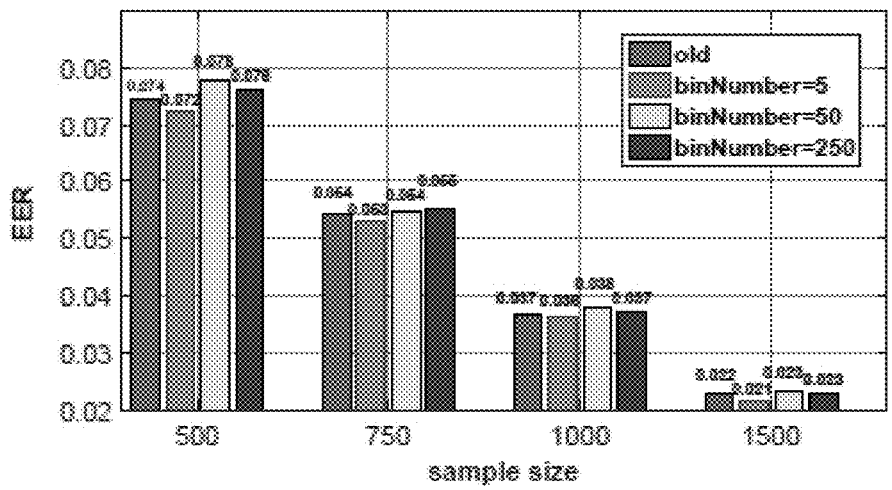
FIG. 13 presents an algorithm for an attack on a user by an adversary.
FIG. 14 presents a plot of EER versus sample size for a simulated attack.

The results for different sample sizes and different bin numbers can be seen in FIG. 14. In FIG. 14, one can see that binNumber=50 has the most successful result on attacking to victims. As the binNumber increases and topBins is held constant, the width of bins will narrow, so the range of forged data will be confined to a very small range. On the other hand, if the binNumber is decreased significantly, the opposite case will happen and the less occurred bins will also be included in the sample generation range, which will decrease the success rate of attacks. As in the previous experiments, EER decreases as the sample size increase. When comparing the efficiency of the statistical attacks for different sample sizes, the attacks are almost have same efficiency for all sample sizes and increases EER increases by 5%-10%. To conclude, even though both imitation and statistical attacks increase the EER of WACA, neither imitation attacks nor did statistical attacks put WACA in danger because of its high-dimensional feature vector and data originated from independent sources.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] L. Kaspersky. (2016, November) Consumer security risks survey 2016. [Online]. Available: https://cdn.press.kaspersky.com/files/2016/10/B2C survey 2016 report.pdf

[2] L. Kaspersky. (2013) Active authentication. [Online]. Available:
http://www.darpa.mil/program/active-authentication

[3] P. Abacus. (2016, May) Google eyes behavioral solution for continuous authentication.
[Online]. Available: http://www.planetbiometrics.com/articledetails/i/4512/desc/google-eyes-behavioural-solution-for-continuousauthentication/#sthash.HCAY7IOm.dpuf

[4] P. Lamkin. (2016, Feb.) Wearable tech market to be worth $34 billion by 2020 @ONLINE. [Online]. Available:
http://www.forbes.com/sites/paullamkin/2016/02/17/wearabletech-market-to-be-worth-34-billion-by-2020/#c9c0993fe383

[5] SmartWatchr. (2015, May) 2015 smartwatch specs comparison chart. [Online]. Available: http://www.smartwatch.me/t/2015-smartwatchspecs-comparison-chart/979

[6] G. Sterling. (2014, March) Study: 60 percent of adults switch screens during the day @ONLINE. [Online].Available: http://marketingland.com/study-60-percent-adults-switchscreens-day-76130

[7] C. M. Tey, P. Gupta, and D. Gao, "I can be you: Questioning the use of keystroke dynamics as biometrics," Annual Network and Distributed System Security Symposium 20th NDSS 2013, 24-27 Feb. 2013.

[8] A. Serwadda and V. V. Phoha, "Examining a large keystroke biometrics dataset for statistical-attack openings," ACM Transactions on Information and System Security (TISSEC), vol. 16, no. 2, p. 8, 2013.

[9] M. S. Obaidat, "A verification methodology for computer systems users," in Proceedings of the 1995 ACM symposium on Applied computing. ACM, 1995, pp. 258-262.

[10] P. Shinde, S. Shetty, and M. Mehra, "Survey of keystroke dynamics as a biometric for static authentication." International Journal of Computer Science and Information Security, vol. 14, no. 4, p. 203, 2016.

[11] A. Alsultan and K. Warwick, "Keystroke dynamics authentication: a survey of free-text methods," International Journal of Computer Science Issues, vol. 10, no. 4, pp. 1-10, 2013.

[12] S. P. Banerjee and D. L. Woodard, "Biometric authentication and identification using keystroke dynamics: A survey," Journal of Pattern Recognition Research, vol. 7, no. 1, pp. 116-139, 2012.

[13] P. S. Teh, A. B. J. Teoh, and S. Yue, "A survey of keystroke dynamics biometrics," The Scientific World Journal, vol. 2013, 2013.

[14] H. Nonaka and M. Kurihara, "Sensing pressure for authentication system using keystroke dynamics." in International Conference on Computational Intelligence. Citeseer, 2004, pp. 19-22.

[15] K. O. Bailey, J. S. Okolica, and G. L. Peterson, "User identification and authentication using multi-modal behavioral biometrics," Computers & Security, vol. 43, pp. 77-89, 2014.

[16] N. Grabham and N. White, "Use of a novel keypad biometric for enhanced user identity verification," in Instrumentation and Measurement Technology Conference Proceedings, 2008. IMTC 2008. IEEE. IEEE, 2008, pp. 12-16.

[17] J. Mantyjarvi, J. Koivumaki, and P. Vuori, "Keystroke recognition for virtual keyboard," in Multimedia and Expo, 2002. ICME'02. Proceedings. 2002 IEEE International Conference on, vol. 2. IEEE, 2002, pp. 429-432.

[18] N. L. Clarke and S. Furnell, "Authenticating mobile phone users using keystroke analysis," International Journal of Information Security, vol. 6, no. 1, pp. 1-14, 2007.

[19] P. Campisi, E. Maiorana, M. Lo Bosco, and A. Neri, "User authentication using keystroke dynamics for cellular phones," Signal Processing, IET, vol. 3, no. 4, pp. 333-341, 2009.

[20] E. Maiorana, P. Campisi, N. Gonź alez-Carballo, and A. Neri, "Keystroke dynamics authentication for mobile phones," in Proceedings of the 2011 ACM Symposium on Applied Computing. ACM, 2011, pp. 21-26.

[21] N. Zheng, K. Bai, H. Huang, and H. Wang, "You are how you touch: User verification on smartphones via tapping behaviors," in Network Protocols (ICNP), 2014 IEEE 22nd International Conference on. IEEE, 2014, pp. 221-232.

[22] M. Trojahn and F. Ortmeier, "Toward mobile authentication with keystroke dynamics on mobile phones and tablets," in Advanced Information Networking and Applications Workshops (WAINA), 2013 27th International Conference on. IEEE, 2013, pp. 697-702.

[23] E. Miluzzo, A. Varshaysky, S. Balakrishnan, and R. R. Choudhury, "Tapprints: your finger taps have fingerprints," in Proceedings of the 10th international conference on Mobile systems, applications, and services. ACM, 2012, pp. 323-336.

[24] E. Owusu, J. Han, S. Das, A. Perrig, and J. Zhang, "Accessory: Keystroke inference using accelerometers on smartphones," Proc. Of HotMobile, 2012.

[25] H. Wang, T. T.-T. Lai, and R. Roy Choudhury, "Mole: Motion leaks through smartwatch sensors," in Proceedings of the 21st Annual International Conference on Mobile Computing and Networking. ACM, 2015, pp. 155-166.

[26] S. Mare, A. M. Markham, C. Cornelius, R. Peterson, and D. Kotz, "Zebra: zero-effort bilateral recurring authentication," in Security and Privacy (SP), 2014 IEEE Symposium on. IEEE, 2014, pp. 705-720.

[27] M. L. Ali, J. V. Monaco, C. C. Tappert, and M. Qiu, "Keystroke biometric systems for user authentication," Journal of Signal Processing Systems, pp. 1-16, 2016.

[28] O. Huhta, P. Shrestha, S. Udar, M. Juuti, N. Saxena, and N. Asokan, "Pitfalls in designing zero-effort deauthentication: Opportunistic human observation attacks," arXiv preprint arXiv:1505.05779, 2015.

[29] V.-D. Stanciu, R. Spolaor, M. Conti, and C. Giuffrida, "On the effectiveness of sensor-enhanced keystroke dynamics against statistical attacks," in Proceedings of the Sixth ACM Conference on Data and Application Security and Privacy. ACM, 2016, pp. 105-112.

[30] W. W.-S. Wei, Time series analysis. Addison-Wesley publ Reading, 1994.

[31] A. Rattani and N. Poh, "Biometric system design under zero and nonzero effort attacks," in 2013 International Conference on Biometrics (ICB). IEEE, 2013, pp. 1-8.

[32] C. Giuffrida, S. Ortolani, and B. Crispo, "Memoirs of a browser: a cross-browser detection model for privacy-breaching extensions," in Proceedings of the 7th ACM Symposium on Information, Computer and Communications Security. ACM, 2012, pp. 10-11.

[33] C. Giuffrida, K. Majdanik, M. Conti, and H. Bos, "I sensed it was you: authenticating mobile users with sensor-enhanced keystroke dynamics," in International Conference on Detection of Intrusions and Malware, and Vulnerability Assessment. Springer, 2014, pp. 92-111.

What is claimed is:

1. A method for computer-based continuous verification, the method comprising:

providing a user terminal;

providing a wearable device comprising a first plurality of sensors configured to receive data from a first user; and providing a non-transitory computer-readable medium, in operable communication with the first plurality of sensors, for performing an enrollment phase and a verification phase, the enrollment phase comprising:

acquiring first data from the first plurality of sensors, which receive the first data from the first user, the first data comprising at least one of keystroke recognition, geolocation, biorhythmic, heart rate, temperature, hand motion, voice, and body motion signals;

removing any outliers from the first data acquired from the first plurality of sensors and filtering the first data acquired from the first plurality of sensors to remove any noise signals;

converting the first data acquired from the first plurality of sensors into a set of identifying features of the first user and inserting the identifying features into a feature vector;

generating a first user profile based upon the feature vector;

transmitting, by a transmitting device, the first user profile to an authentication server; and the verification phase comprising:

detecting that the user terminal is being accessed by a user;

acquiring second data from a second plurality of sensors, which receive the second data from the user, the second data comprising at least one of keystroke recognition, geolocation, biorhythmic, heart rate, temperature, hand motion, voice, and body motion signals;

removing any outliers from the second data acquired from the second plurality of sensors and filtering the second data acquired from the second plurality of sensors to remove any noise signals;

converting the second data acquired from the second plurality of sensors into a set of identifying features of the user;

receiving, by the user terminal, the first user profile from the authentication server;

comparing the first user profile to the set of identifying features from the user; and either suspending user terminal access if the first user profile does not match the set of identifying features from the user; or permitting the user to maintain access to the user terminal if the first user profile matches the set of identifying features from the user; and continuously executing the verification phase until the user stops using the user terminal.

2. The method of claim 1, further comprising:

assigning each sensor of the first plurality of sensors and each sensor from the second plurality of sensors a respective identification number, and separating the first data acquired from the first plurality of sensors and the second-data acquired from the second plurality of sensors according to the respective identification numbers.

3. The method of claim 1, the identifying features being generated from a time domain, a frequency domain, or both.

4. The method of claim 1, the first user profile comprising a first user identification, a time stamp for the beginning of first data acquisition, and a timestamp for the end of first data acquisition.

5. The method of claim 1, comparing the first user profile to the set of identifying features from the user comprises determining the validity of the second data acquired from the second plurality of sensors.

6. A system of computer-based continuous verification, the system comprising:

a user terminal;

an authentication server;

a wearable device comprising a first plurality of sensors configured to receive data from a first user; and a non-transitory computer-readable medium, in operable communication with the first plurality of sensors, for performing an enrollment phase and a verification phase, the enrollment phase comprising:

acquiring first data from the first plurality of sensors, which receive the first data from the first user, the first data comprising at least one of keystroke recognition, geolocation, biorhythmic, heart rate, temperature, hand motion, voice, and body motion signals;

removing any outliers from the first data acquired from the first plurality of sensors and filtering the first data acquired from the first plurality of sensors to remove any noise signals;

converting the first data acquired from the first plurality of sensors into a set of identifying features of the first user and inserting the identifying features into a feature vector;

generating a first user profile based upon the feature vector;

transmitting, by a transmitting device, the first user profile to an authentication server, and the verification phase comprising:

detecting that the user terminal is being accessed by a user;

acquiring second data from a second plurality of sensors, which receive the second data from the user, the second data comprising at least one of keystroke recognition, geolocation, biorhythmic, heart rate, temperature, hand motion, voice, and body motion signals;

removing any outliers from the second data acquired from the second plurality of sensors and filtering the second data acquired from the second plurality of sensors to remove any noise signals;

converting the second data acquired from the second plurality of sensors into a set of identifying features of the user;

receiving, by the user terminal, the first user profile from the authentication server;

comparing the first user profile to the set of identifying features from the user; and either suspending user terminal access if the first user profile does not match the set of identifying features from the user; or permitting the user to maintain access to the user terminal if the first user profile matches the set of identifying features from the user; and continuously executing the verification phase until the user stops using the user terminal.

7. The system of claim 6, each sensor of the first plurality of sensors and each sensor of the second plurality of sensors being assigned a respective identification number, and the first data acquired from the first plurality of sensors and second data acquired from the second plurality of sensors being separated according to the respective identification numbers.

8. The system of claim 6, the first user profile comprising a first user identification, a time stamp for the beginning of first data acquisition, and a timestamp for the end of first data acquisition.

9. The system of claim 6, at least one sensor of the first plurality of sensors being an accelerometer or a gyroscope, and at least one sensor of the second plurality of sensors being an accelerometer or a gyroscope.

10. The system of claim 6, the identifying features being generated from a time domain, a frequency domain, or both.

11. A non-transitory computer readable-medium comprising stored instructions that when executed cause at least one processor to:

perform an enrollment phase comprising:

acquiring first data from a first plurality of sensors, which receive the first data from a first user, the first data comprising at least one of keystroke recognition, geolocation, biorhythmic, heart rate, temperature, hand motion, voice, and body motion signals;

removing any outliers from the first data acquired from the first plurality of sensors and filtering the first data acquired from the first plurality of sensors to remove any noise signals;

converting the first data acquired from the first plurality of sensors into a set of identifying features of the first user and inserting the identifying features into a feature vector;

generating a first user profile based upon the feature vector; and transmitting the first user profile to an authentication server, the first user profile comprising a user identification, a time stamp for the beginning of first data acquisition, and a timestamp for the end of first data acquisition, and perform a verification phase comprising:

detecting that a user terminal is being accessed by a user;

acquiring second data from a second plurality of sensors, which receive the data from the user, the second data comprising at least one of keystroke recognition, geolocation, biorhythmic, heart rate, temperature, hand motion, voice, and body motion signals;

removing any outliers from the second data acquired from the second plurality of sensors and filtering the second data acquired from the second plurality of sensors to remove any noise signals;

converting the second data acquired from the second plurality of sensors into a set of identifying features of the user;

retrieving the first user profile from the authentication server;

comparing the first user profile to the set of identifying features from the user; and either suspending user terminal access if the user profile does not match the set of identifying features from the user; or permitting the user to maintain access to the user terminal if the first user profile matches the set of identifying features from the user; and continuously executing the verification phase until the user stops using the user terminal.

12. The method of claim 1, further comprising:

storing a plurality of user profiles in the authentication server;

comparing the set of identifying features of the user to the plurality of user profiles; and either suspending user terminal access if no user profile of the plurality of user profiles matches the set of identifying features from the user; or permitting user terminal access if any user profile of the plurality of user profiles matches the set of identifying features from the user.

13. The system of claim 6, further comprising:

the authentication server being configured to store a plurality of user profiles and the verification phase further comprising:

comparing the set of identifying features from the user to the plurality of user profiles; and either suspending user terminal access if no user profile of the plurality of user profiles matches the set of identifying features from the user; or permitting user terminal access if any user profile of the plurality of user profiles matches the set of identifying features from the user.

14. The non-transitory computer readable-medium of claim 11, a plurality of user profiles being stored in the authentication server and the stored instructions when executed further cause at least one processor to:

compare the set of identifying features from the user to a plurality of user profiles; and either suspend user terminal access if no user profile of the plurality of user profiles matches the set of identifying features from the user; or permit user terminal access if any user profile of the plurality of user profiles matches the set of identifying features from the user.

* * * * *